F. W. BECKWITH.
Trace-Fastening.
No. 197,815. Patented Dec. 4, 1877.
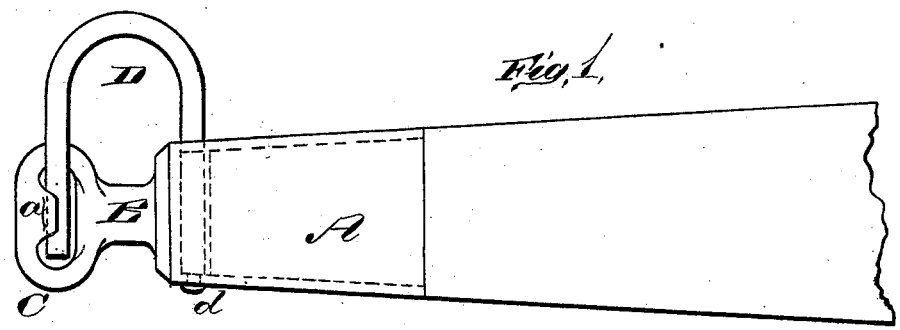
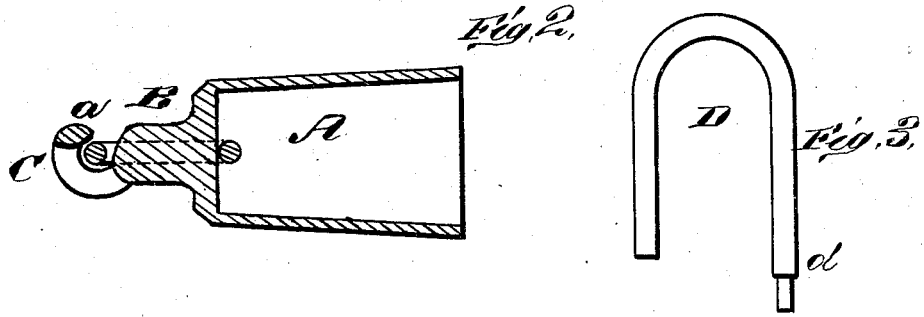
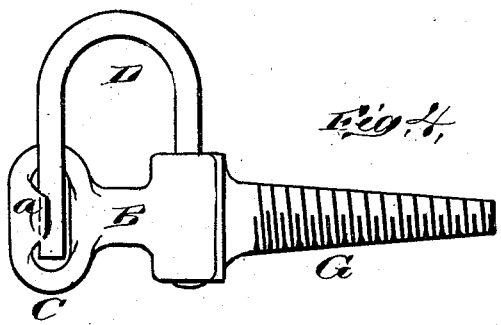

UNITED STATES PATENT OFFICE.

FRANK W. BECKWITH, OF FLINT, MICHIGAN.

IMPROVEMENT IN TRACE-FASTENINGS.

Specification forming part of Letters Patent No. 197,815, dated December 4, 1877; application filed October 20, 1877.

*To all whom it may concern:*

Be it known that I, FRANK WILLIAM BECKWITH, of the city of Flint, in the county of Genesee and State of Michigan, have invented a new and valuable Improvement in Trace-Fastenings; and I do hereby declare that the following is a full, clear, and exact description of the construction and operation of the same, reference being had to the annexed drawings, making a part of this specification, and to the letters and figures of reference marked thereon.

Figure 1 of the drawings is a representation of my trace-fastening as applied to a whiffletree. Fig. 2 is a vertical sectional view. Fig. 3 is a view of the spring. Fig. 4 is a side view of my trace-fastening.

The nature of my invention consists in the construction and arrangement of a trace-fastening, as will be hereinafter more fully set forth.

The annexed drawing, to which reference is made, fully illustrates my invention.

A represents an ordinary ferrule, to go on and be fastened to the end of a whiffletree, said ferrule being, on its outer end, formed with a projecting pin or shank, B, upon which the trace is hooked. This pin or shank B is usually formed with a head or button; but I provide it with a ring or loop, C, the outer side of which forms a lip or catch, *a*, as shown. D represents a U-shaped spring, made of wire or other suitable material. One arm of this spring is milled, as shown at *d*, and this arm is passed through the outer end of the ferrule A, and the milled portion then riveted, so that the spring cannot be pulled out, while it is capable of turning, as on a pivot. The other arm of the spring D is to be forced down upon the loop or ring C and caught under the lip or catch *a*.

Instead of the ferrule A, the pin or shank B may be formed on the end of a screw, G, which is screwed into the end of the whiffletree.

When the trace is placed on the pin B, the spring D is turned, to be locked in place by the lip or catch *a*, and the form of the spring acts as a fastener for the trace.

What I claim as new, and desire to secure by Letters Patent, is—

The ferrule A or its equivalent, shank B, loop C, with rearwardly-projecting lip *a*, all formed in one piece, in combination with U-shaped spring D, which is pivoted to ferrule A near its outer end, substantially as shown, and for the purpose set forth.

In testimony that I claim the above I have hereunto subscribed my name in the presence of two witnesses.

FRANK WILLIAM BECKWITH.

Witnesses:
    K. M. WHITEHOUSE,
    M. W. ELLSWORTH.